UNITED STATES PATENT OFFICE.

HERMAN E. BROWN, OF KINGSTON, NEW YORK, ASSIGNOR OF ONE-HALF TO WILLIAM R. WARREN, OF NEW YORK, N. Y.

PROCESS OF MAKING HYDRAULIC CEMENT.

1,124,238.     Specification of Letters Patent.     Patented Jan. 5, 1915.

No Drawing.     Application filed November 16, 1914. Serial No. 872,368.

*To all whom it may concern:*

Be it known that I, HERMAN E. BROWN, a citizen of the United States, and a resident of Kingston, county of Ulster, State of New York, have invented certain new and useful Improvements in Processes of Making Hydraulic Cement, of which the following is a specification.

My invention relates to improvements in processes of making hydraulic cement and more especially to a process in which useful potash or other alkali metal salts may be obtained as a by-product.

The main object of the invention is to provide a process in which hydraulic cement may be obtained directly from feldspar (orthoclase) or equivalent materials, and in which substantially all of the raw product except moisture and $CO_2$ is converted into useful and valuable materials such as hydraulic cement and potash salts.

In carrying out my process in the preferred form I take the feldspar and fuse it under oxidizing or non-reducing conditions in a suitable furnace with a sufficient quantity of calcium chlorid to furnish sufficient chlorin to combine with the potassium in the feldspar and with a sufficient quantity of calcium carbonate to bring the CaO content in the resulting material up to between 40 per cent. and 55 per cent. In this respect magnesia is to a certain extent the equivalent of lime, so that whenever I speak of the lime content being between 40% and 55%, or about 50%, I mean lime or its equivalent. The calcium chlorid combines with the potassium in the silicate forming potassium chlorid, which is volatilized and may be collected by suitable well known condensing apparatus. The resulting slag may be about the following composition: silica 35 per cent., alumina 10 per cent., calcium oxid 52 per cent., remainder 3 per cent. The fused material is allowed to run from the furnace either directly or from a ladle, preferably onto a rotary drum, so that it is distributed in finely divided particles in a chamber filled with a spray of an aqueous solution of an alkali metal or alkaline earth sulfate such as magnesium sulfate. The magnesium sulfate being in aqueous solution (say in a 5 per cent. solution) and coming into contact with the particles of the melted material, the water of the solution is quickly evaporated, thereby breaking up the material as it cools. This action produces marked changes in the chemical and physical character of the fused silicates.

The term "fusion," "fused" and equivalent expressions in this application, mean nothing less than a completely liquid melted product and are distinct from the terms "incipient fusion" or "clinkered," as sometimes used in furnace operation.

Instead of using calcium chlorid any cheap halogen salt may be substituted, or salts capable of furnishing a combining element or elements and forming thus an easily volatilizable compound of potassium or other alkalis, and instead of using calcium carbonate any other suitable calcareous material may be used which will increase the CaO content of the resulting product to the proper percentage. Likewise, other suitable water soluble salts of the alkali forming metals may be injected into the hot material in the second step of the process and in some cases other materials such as iron salts, etc., the idea being that in the second stage of the process the necessary ingredients are added in order to increase the hydraulic properties of the material to produce a hydraulic cement, which ingredients vary according to the nature of the base material operated upon, and the particular kind or quality of hydraulic cement desired. I believe these material act to form in the finished cement a certain amount of Sorel cement or its equivalent, which gives the desired hydraulic properties. I use the term alkali forming metal to include both the alkali metals and alkaline earth metals. The second step of the process changes the character of the melted material and renders it suitable for production of a hydraulic cement, because the salt in solution coming into contact with the hot product causes the changes essential in producing a material which exhibits after being ground the physical characteristics of a Portland cement. To this product is subsequently added a sufficient amount of plaster or gypsum in order to produce the desired time of set in the cement.

While speaking of the salt which is brought into contact with the hot slag as being in solution I use the term solution in its most general sense, so as to include, for instance, liquid suspensions and molten baths.

Instead of using the calcium chlorid above mentioned, calcium carbonate alone may be used in the first step of the process. Thus if a double silicate of potassium and aluminum be taken having substantially the following composition: silica 65%, alumina 18%, potassium oxid 14%, and traces of ferric, sodium, calcium and magnesium oxid, and these materials combined with a comparatively pure limestone or marble in proportion of 100 parts of the double silicate to 170 parts of the calcium carbonate, a fused product is produced, of about the following composition: silica 35%, alumina 10%, calcium oxid 52%, remainder 3%. These materials melt very easily, and at a temperature of 200° to 300° centigrade lower than is required for the manufacture of Portland cement, that is, a temperature of about 1300° C. This renders their furnacing a comparatively simple matter, the materials being quarried and crushed to approximately the sizes required for blast furnace operation, though if desired they may be coarsely crushed through rolls and treated in a reverberatory furnace. When the materials are fused the alkali is volatilized and combined with excess of carbon dioxid to form potassium carbonate which may be condensed in the flues and saved by any suitable well known mechanical construction of the furnace which cools the escaping gases. If the materials are combined in the proportions as last stated, for every 100 pounds of orthoclase it is possible, if full recovery of all the potash is made, to secure 24.7 pounds of potassium carbonate. Every barrel of cement would require approximately 200 pounds of orthoclase if allowances are made for impurities in the limestone and for additions of ash and magnesium sulfate and gypsum, which may be added in the second step; therefore, for every barrel of hydraulic cement produced from such materials, it would be possible, if full recovery is made, to obtain 49.5 pounds of potassium carbonate. By carrying out the fusion under oxidizing or non-reducing conditions, the production of sulfids and metallic pellets is prevented which have hitherto given much trouble and proved very disadvantageous in high silica cement produced in the manner stated.

It will be understood that various calcareous materials may be used in the fusion of the silicious material, although calcium carbonate, except as to the special salt used to unite with the potash, is preferred. Calcium sulfate, for instance, may be used but it is not as satisfactory because $SO_3$ is liberated only at a comparatively higher temperature, and it is more difficult to make a cement when using this mineral.

By the use of my improved process orthoclase or potassium or other alkali metal silicate rocks or other silicious material may be used for the production of a hydraulic cement, and at the same time give as a by-product a relatively higher percentage of volatilized potash or other alkali than has been possible to obtain from any previous process by furnace treatment of which I am aware.

Although I have described my improvements in great detail and with respect to certain particular embodiments thereof, nevertheless I do not desire to be limited to such details except as clearly specified in the appended claims, since many changes and modifications may be made without departing from the spirit and scope of my invention in its broader aspects.

Having fully and clearly described my improvements, what I claim as new and desire to secure by Letters Patent is:—

1. The process of obtaining cement and potash from feldspar, which consists in fusing feldspar with a sufficient quantity of calcium chlorid to furnish combinable chlorin for all the potassium and a sufficient quantity of calcium carbonate to bring the CaO content of the resulting fused material up to between 40% and 55%, collecting the volatile potash salt, and treating the material while molten with an aqueous solution of magnesium sulfate to produce hydraulic cement.

2. The process of obtaining cement and potash from feldspar, which consists in fusing the feldspar under non-reducing conditions with a sufficient quantity of a halogen salt to combine with the potassium and a sufficient quantity of calcium salt to bring the CaO content of the resulting cement up to between 40% and 55%, collecting the volatile potash salt, and treating the molten product while molten with one or more salts of alkali forming metals in solution capable of increasing the hydraulic properties of the resulting product to produce hydraulic cement.

3. The process of obtaining cement and alkali salt from alkali bearing silicates, which consists in fusing the silicious material with a sufficient quantity of a halogen salt to combine with the alkali and a sufficient quantity of a calcium salt to bring the CaO content of the resulting product up to between 40% and 55%, separating out the alkali salt, and treating the residual material while molten with a Sorel cement forming salt in solution to form Sorel cement or its equivalent in the finished cement and increase the hydraulic properties of the hydraulic cement in which the CaO content is between 40% and 55%.

4. The process of obtaining cement and potash from potash bearing silicates, which consists in fluxing the silicious material under non-reducing conditions with a sufficient quantity of a halogen salt which supplies the required amount of halogen to combine with the potassium and with a calcium compound, separating out the potash salt, and treating the melted product while molten with a suitable salt in solution capable of increasing the hydraulic properties thereof to produce hydraulic cement.

5. The process of obtaining cement and potash from potash and aluminum bearing silicious material, which consists in combining the silicious material with calcareous material to combine with the potash and bringing the CaO content of the resultant fused material up to between 40% and 55%, removing the potash salt, and treating the remaining product while molten with one or more salts of alkali forming metals in solution capable of increasing the hydraulic properties thereof to produce hydraulic cement in which the CaO content is between 40% and 55%.

6. The process of producing cement and alkali salts from aluminum and alkali bearing silicious material, which consists in fusing the silicious material with calcareous material under non-reducing conditions, collecting the volatile alkali compound or compounds, and then treating the resulting slag while molten with a suitable salt in solution capable of increasing the hydraulic properties thereof to produce hydraulic cement.

7. The process of producing cement and potassium salts from aluminum and potassium bearing silicious material, which consists in fusing the silicious material with calcareous materal under oxidizing conditions, collecting the volatile potassium compound or compounds, and then treating the resulting melt with the necessary reagents in solution capable of increasing the hydraulic properties thereof to produce hydraulic cement.

8. The process of obtaining potash and cement from feldspar, which consists in fusing the feldspar with calcareous material, collecting the volatile potash compound, and then treating the resulting product while molten with the necessary ingredients in solution to increase the hydraulic properties thereof to produce hydraulic cement.

9. The process of producing cement and potassium salts from aluminum and potassium bearing silicious material, which consists in fusing the silicious material with calcareous material, separating out the potassium compound or compounds, and then treating the remaining product while molten with a Sorel cement forming salt or salts in solution to form Sorel cement or its equivalent in the finished cement and increase the hydraulic properties of the cement.

10. The process of producing cement from feldspar, which consists in fusing the same with a sufficient quantity of calcareous material to bring the CaO content of the resulting product up to between 40% and 55% and then treating this product while hot with liquid salts capable of increasing the hydraulic properties thereof to produce hydraulic cement in which the CaO content is between 40% and 55%.

11. The process of obtaining cement and potash from potash bearing silicious material which consists in fusing the material with a sufficient quantity of any suitable chemical reagent which produces an easily volatilizable potassium compound and a sufficient quantity of calcareous material to bring the CaO content of the resultant cement up to between 40% and 55%, collect the volatilized potash compound, and treating the fused product while molten with an aqueous solution of one or more salts of alkali forming metals capable of increasing the hydraulic qualities thereof to produce hydraulic cement.

In testimony whereof, I have signed my name to this specification, in the presence of two subscribing witnesses.

HERMAN E. BROWN.

Witnesses:
GORHAM CROSBY,
EDWIN SEGER.